United States Patent [19]

Kopp

[11] Patent Number: 4,964,577
[45] Date of Patent: Oct. 23, 1990

[54] PROCESS FOR DIVIDING UP AND RECOVERING THE INDIVIDUAL MATERIALS FROM OLD CABLES

[75] Inventor: Wilhelm Kopp, Pfrungen, Fed. Rep. of Germany

[73] Assignee: Maschinenfabrik Bezner GmbH & Co. KG, Ravensburg, Fed. Rep. of Germany

[21] Appl. No.: 376,670

[22] Filed: Jul. 7, 1989

[30] Foreign Application Priority Data

Jul. 8, 1988 [DE] Fed. Rep. of Germany ....... 3823230

[51] Int. Cl.$^5$ .............................................. B02C 19/12
[52] U.S. Cl. ......................................... 241/24; 241/29
[58] Field of Search .................... 241/24, 29, 3, 101.4, 241/DIG. 38, 76, 77, 78

[56] References Cited

FOREIGN PATENT DOCUMENTS

| | | |
|---|---|---|
| 2655424 | 6/1977 | Fed. Rep. of Germany . |
| 3412044 | 10/1985 | Fed. Rep. of Germany . |
| 3443042 | 5/1986 | Fed. Rep. of Germany ........ 241/24 |
| 3442941 | 6/1986 | Fed. Rep. of Germany . |
| 3529322 | 2/1987 | Fed. Rep. of Germany . |
| 88978 | 8/1978 | Japan ................................... 241/24 |
| 2155937 | 10/1985 | United Kingdom .................. 241/24 |

*Primary Examiner*—Mark Rosenbaum
*Attorney, Agent, or Firm*—Spencer & Frank

[57] ABSTRACT

The invention relates to a process for dividing up and recovering the individual materials from old cables. For this purpose, the cable mixture is sorted into individual constituents and cut to size, the outer plastic sheath is removed by being slit open, and the individual cores are fed to a disk comminuter. It is essential, at the same time, that the disk comminuter should cut up the individual plastic-sheathed cables or the cable composed of several individual cables into short cable pieces of a length of 3 to 10 mm in a salami-like manner. Because the pieces are very short, the short cable pins are separated from the plastic ring arranged round them on a following vibrating screen.

6 Claims, 2 Drawing Sheets

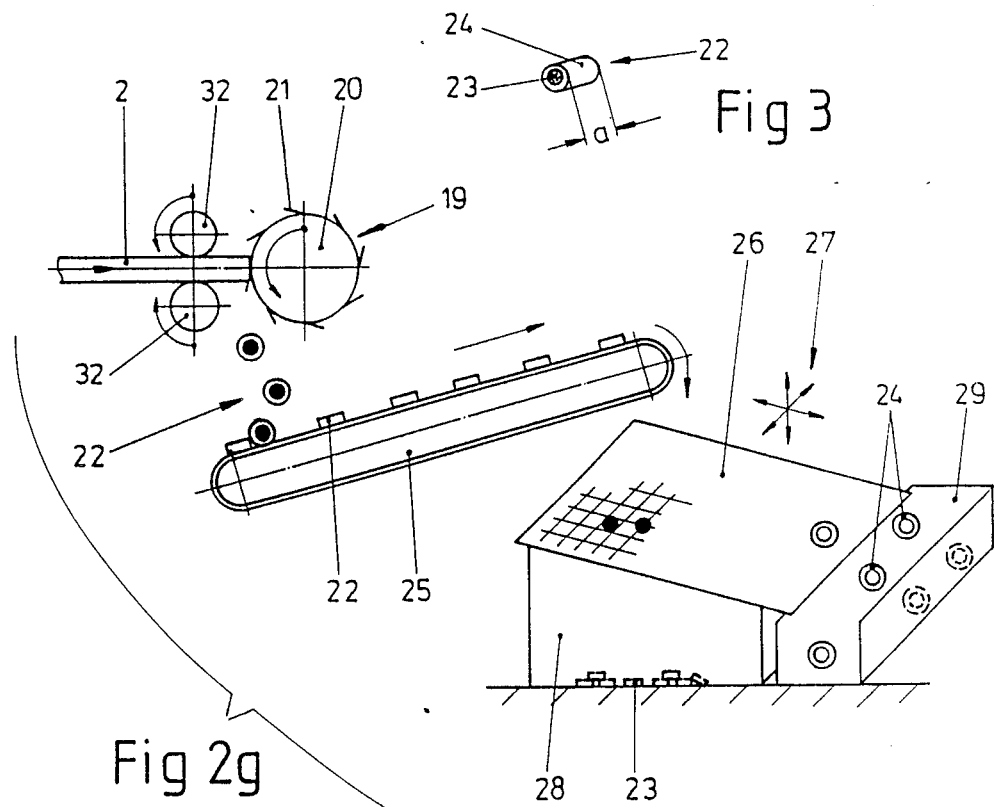
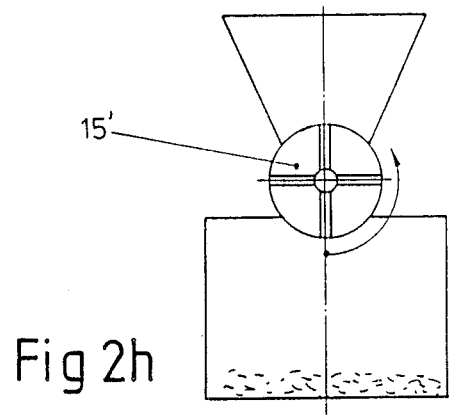

PROCESS FOR DIVIDING UP AND RECOVERING THE INDIVIDUAL MATERIALS FROM OLD CABLES

BACKGROUND OF THE INVENTION

1. Field of the Invention

The invention relates to a process for dividing up and recovering the individual materials from old cables, according to the preamble of claim 1.

2. Background Art

Old cables occur in large quantities during the renewal of buried cables or overhead cables and in communes, industrial plants or electricity companies. At the same time, the cable diameters can quite often amount to 5 to 10 cm, and the utilization, that is to say recovery of the individual cable constituents is expedient especially as regards cables with a diameter of 2 cm and above. Cables of this type are composed of several individual cable strings which are constructed in strand form with a copper strand or aluminum strand or as a solid cable and which are each sheathed with a plastic. In this arrangement, several strand-shaped or solid cable strings are combined and surrounded by a plastic and/or lead sheathing. The entire cable can then be equipped once again with a plastic sheathing.

German Offenlegungsschrift 2,655,424 has already made known a process in which the cables are severed in a transverse plane and a longitudinal plane and the individual parts thus separated are sorted. However, the disadvantage of cutting through all the sheathed layers completely is that the further processing of the individual parts involves a high outlay and is inexact.

German Offenlegungsschrift 3,412,044 has made known an apparatus for the mechanical dismemberment of cables which carries out cutting to a specific length and processing in a special cutting head. In particular, this known publication provides a sheath long-slitting apparatus which makes it possible to divide the cable up into its individual inner constituents. The cables are severed to a sortable length by a following cutting unit and the individual parts are sorted. The disadvantage of this apparatus too is that subsequent sorting of strand-shaped inner cables can be carried out only with difficulty and in an unsatisfactory way.

A similar process is described in German Offenlegungsschrift 3,529,322, in which the cable remains are cut into small parts in a comminuting machine and dismembered into a loose mixture of metal and insulating material. The comminuted material is conveyed into a separating apparatus by means of a blower and is sorted according to the type of material by washing with water. The disadvantage of this process is that a complicated method of separating the comminuted material is employed, and in particular the disposal of the heavily laden water presents problems.

Finally, German Offenlegungsschrift 3,442,941 makes known a further apparatus for dividing up the insulating sleeves of cables, especially of cable waste, oppositely rotatable rollers with guide and transport grooves being provided for the cable, and a knife disk slitting open the cables. Once again, this apparatus solves the problem of the re-utilization of cable waste only to an unsatisfactory degree, since slit-open cables can be sorted and transported only inadequately.

SUMMARY OF THE INVENTION

The object on which the invention is based is to provide a process for recovering and dividing up the individual constituents of old cables, a complete dividing up and dismemberment into the individual constituents of handleable size being carried out.

Starting from a process according to the preamble of claim 1, this object is achieved by the combination of the process steps of the defining clause which take place individually or severally. Depending on the cable composition, in particular individual process steps can be used in isolation from one another.

Advantageous developments and improvements of the individual process steps are set forth in further detail below.

The invention is described in detail by means of the drawing figures having a basic representation of the individual process steps in which

BRIEF DESCRIPTION OF THE DRAWINGS

FIG. 2a-2h are individual steps of the cable recovery method of the invention; and FIG. 3 is a perspective view of a cable pin formed in a comminution step of the invention as seen in FIG. 2g.

DETAILED DESCRIPTION OF THE PREFERRED EMBODIMENT

Figure 1:
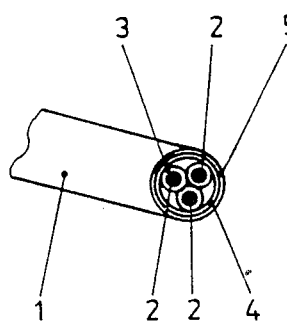
FIG. 1 is a perspective view of a typical cable to be treated by the method according to the invention.

The type of cables to be sorted is sufficiently known from the literature. As an example, FIG. 1 shows an old cable 1 which, for example, has three strand-shaped copper or aluminum cores 2, each covered individually with a polyethylene sheath (PE) 3. Round these three individual cores 2 there can be a further plastic sheath 4, for example likewise made of polyethylene or PVC. However, this sheath 4 can also be a lead sheathing for shielding purposes. The assembly as a whole is then surrounded, in turn, by a final outer sheath 5, for example made of PVC.

Figure 2A:
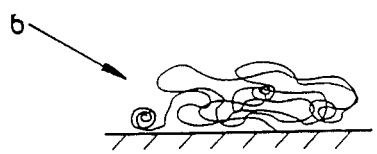

Cables of this type occur in relatively large quantities and in widely varying thicknesses, the cables being found in unsorted piles 6 of widely differing compositions. In particular, the cables 6 of FIG. 2a can have oil-impregnated inner sheathings which also have to be taken into account during the processing.

Figure 2B:
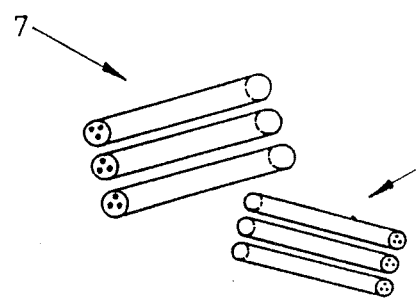
Figure 2C:
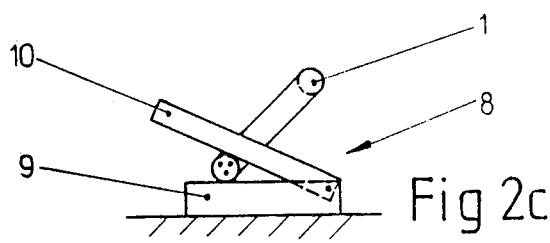

First, as seen in FIG. 2b the cable mixture 6 is sorted into the individual cable grades 7, 7' according to their type, in order, for example, to separate aluminum and copper cores 2 or PVC from PE outer sheathings 5. Then, as seen in FIG. 2c the sorted cables 7 are cut to individual cable portions of the size of 50 to 100 cm in a comminuting machine 8 which works in the manner of scissors with a stationary knife 9 and a scissor knife 10. This cutting to size serves for the easier further processing of the individual cables which are otherwise somewhat coiled and bent.

Figure 2D:
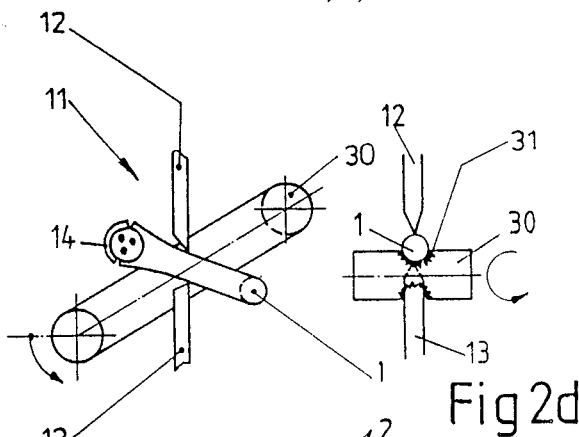
Figure 2F:
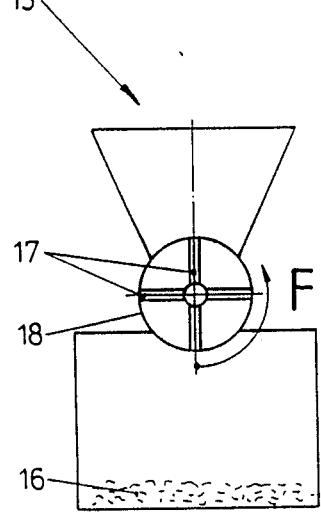
Figure 2E:
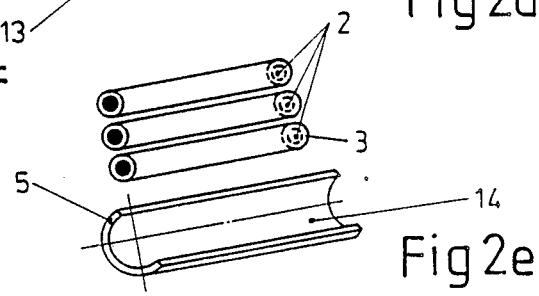

In a following cable-sheath slitting-open machine 11, as seen in FIG. 2d, the outer cable sheath 5 is slit open into two cable halves 14 by an upper knife 12 and a lower knife 13. These slit-open cable sheaths of a specific type of plastic, for example PVC, are then comminuted in a following knife mill 15 to form plastic granules 16 as seen in FIGS. 2e and 2f. The knife mill contains one or more internally rotating knives 17 which beat the plastic material to be comminuted, until the parts fall through the casing 18 designed as a screen. In this way, granules of specific size can be produced from a type of plastic, that is to say the outer plastic sheath is recovered as pure plastic granules.

The outer sheath 5 of the old cable is thus slit open by the cable-sheath slitting-open machine 11. From this emerge several cores 2 composed of copper or aluminum strands which themselves are surrounded by a plastic sheathing 3 (for example PE) (see the cable cross section). However, this further plastic sheathing is not slit open once again. On the contrary, these plastic-sheathed cables are fed to a following disk comminuter 19 by means of a pair of driven grooved rollers 32 as seen in FIG. 2g.

The disk comminuter has a disk roller 20 rotating at a very high rotational speed and having tangentially projecting knives 21 which cut open the cable 2, including the plastic sheathing 3, to form disks. This salami-like cutting open results in round plastic disks 22 of FIG. 3 with a plurality of cable pins 23 located on the inside and with an outer plastic ring 24. The cable pins 23 are formed by the cut-off strand 2 and the plastic ring 24 by the insulation 3 surrounding the strand. This plastic disk 22 and consequently the individual wires or cable pins 23 have a length $a$ of approximately 3 to 5 mm. This length must be kept relatively small, so that the cable pins 23 can subsequently be separated from the plastic ring 24 arranged round them. The disk comminuter 19 can also be designated as a chopper disk, shaft comminuter or the like. It is known, in principle, from other sectors of use, especially wood comminution. The disk comminuter rotates at a high rotational speed and with a flywheel mass, so that it can sever the relatively thick cables to form disks.

The cable disks or plastic disks 22 cut off in this way are transported via a conveyor 25 of FIG. 2g onto a vibrating screen 26 to which a high-frequency short vibrating motion is imparted. This type of motion is represented by the arrows 27. By means of the vibrating screen, the inner copper or aluminum pins 23 are separated from the annular plastic sheathing 24, the cable pins 23 falling through the vibrating screen into the container 28 located underneath, whilst the annular plastic disks 24 pass into a following container 29. This dividing up of the plastic disks 22 is possible only because the disks 22 of very small length $a$ are cut off so short by the disk comminuter 19 that the cable pins 23 easily come loose from the surrounding plastic ring 24 as a result of vibration. The clean copper or aluminum pins 23 in the container 28 can then be delivered to the further-processing industry at very favorable prices because of their purity. The same applies to the individual types of plastic produced. For this, the plastic rings obtained in the container 29 can be reprocessed in this form or in a form comminuted once more. This can be carried out in a further knife mill 15′ as seen in FIG. 2h.

According to the invention, the disk comminuter 19 processes cable grades such as those described as a general cable composition in the introduction of the description, that is to say a cable composed of several cores 2 and covered with several different plastic sheathings 3, 5. At the same time, the inner cables 2 can take the form of solid individual cable stranding or strand-shaped metal cables. Because, according to the invention, these cables are cut into individual rings of relatively short length $a$ and these rings are subsequently vibrated on the vibrating screen 26, the cable breaks down into its individual constituents which, because they are cut up in a salami-like manner, have different geometrical shapes in each case. In this case, the individual plastic rings of the particular sheathings can then be divided up by means of several screens 26 arranged in succession.

Insofar as the cable has an oil-impregnated inner sheathing this too can be processed by means of the disk comminuter 19. If appropriate, the rings then have to be subjected to an intermediate or subsequent washing operation.

The invention is not restricted to the exemplary embodiment illustrated. On the contrary, it also embraces all developments open to an average person skilled in the art, without any intrinsic inventive content.

What is claimed is:

1. A process for dividing up and recovering the individual materials from old cables, comprising plastic-sheathed and/or metal-sheathed individual cables, cable strands or solid cables, said process comprising:
   sorting the cables according to their type;
   slitting open the cables and removing from the cables an outer plastic sheathing of the cables to yield slit outer plastic sheathing and plastic-sheathed individual wires having an inner copper or aluminum strand;
   granulating the outer plastic sheathing to form plastic granulate;
   chopping the plastic-sheathed individual wires to yield wire disks of a disk thickness of 3 to 10 mm; and
   vibration screening the wire disks for causing the wire disks to separate into cable pins or strand pins and into plastic sheathing rings.

2. A process as claimed in claim 1, further comprising comminuting the cables after the sorting step into manually handleable pieces by a comminuting machine which works in the manner of a cutting knife with a stationary knife and a scissor knife.

3. A process as claimed in claim 2, wherein the slipping open step is carried out by a cable-sheath slitting-open machine, the cable-sheath slitting-open machine has a grooved roller with a U-shaped cable-receiving profile, and the outer plastic sheathing of the cables is slit open from above and below by means of two radially engaging knives.

4. A process as claimed in claim 1, wherein the chopping step is carried out by a disk comminuter, the disk comminuter comprises one of a rotating knife roller and a disk roller with a high flywheel mass and rotational speed, and cutting knives are arranged tangentially on the disk roller, and wherein cable fed radially to the roller is comminuted to form the disks of a disk thickness of 3 to 10 mm.

5. A process as claimed in claim 4, wherein continuous feeding of the cable to the disk comminuter is carried out by means of a drivable grooved roller.

6. A process as claimed in claim 1, further comprising granulating the plastic sheathing rings in a following knife mill.

* * * * *